United States Patent Office 3,432,044
Patented Mar. 11, 1969

3,432,044
INSTALLATION FOR STORING ARTICLES, PARTICULARLY FOR PARKING VEHICLES
Karl Heinz Stienen, Rainacker, Sinneringen, Bern, Switzerland
Filed Feb. 8, 1965, Ser. No. 430,847
Claims priority, application Switzerland, Feb. 26, 1964, 2,396/64; Dec. 28, 1964, 16,723/64
U.S. Cl. 214—16.1   2 Claims
Int. Cl. E04h 6/00

ABSTRACT OF THE DISCLOSURE

An installation for storing articles, especially for parking vehicles, which comprises a housing and a number of storage stories for the articles supported by and within such housing. Each storage story is provided with substantially horizontally disposed track means upon which there are arranged a plurality of similar article-support platforms. Further, lift means are provided for transferring a support platform from one storage story to another when the article-support platforms at all of the stories are at standstill. Such lift means advantageously incorporate an elevator platform which can be stopped at any given storage story and wherein track section means are carried by said elevator platform which serve to cooperate with the track means at each storage story in order to provide a closed track for transfer and displacement of the article-support platforms thereon. According to one important aspect of the invention, drive means are also provided for displacing the article-support platforms in that horizontally disposed track means of a given storage story which is closed by the track section means carried by the elevator platform and further, such drive means are advantageously mounted at the elevator platform which always has disposed thereon an article support platform. Also, according to a further feature of the invention there is a slip free driving connection between all platforms and the drive means of the elevator platform.

---

The present invention has reference to an improved installation for the storing of articles os goods, in particular for the parking of automobiles.

A pretty extensive survey of the state of the art in the field of vehicular parking installations appears in the work entitled "Parkbauten" (parking garages) by Otto Sill. Here there are also listed the numerous requirements placed upon such installations.

In one of the parking installations described in this publication the automobiles are deposited upon separately movable platforms situated next to one another in superimposed rows. In so doing, the beginning and ends of the rows situated above one another are interconnected by a vertical conveyor constructed in the manner of an endless chain or bucket belt elevator in which, in each instance, at least as many receiving devices for a platform are arranged as there are available rows. In this installation, a displacement of the platforms in two stories is necessary, and accordingly, also two elevators or lifts are required. Transfer of the platforms must take place stepwise because there must always only occur a horizontal displacement of the platform through the length of one of such platforms, then a vertical displacement through the height of a story, and again a horizontal displacement, and so forth. This requires, for each half cycle, an acceleration and retardation or delay of considerable masses.

Swiss Patent 370,564 teaches a parking installation in which, at a number of stories, a respective series of small, similar and hingedly connected wagons or carriages provided with rollers or runners, have a supporting portion constructed in comb-like fashion, and wherein such series of small cars is arranged along circular tracks. Between the first and the last small wagon of each series there is maintained a space or gap, the length of which approximately corresponds to the length of one small wagon. Quite complicated lifting means are provided which incorporate conveyor chains, the elements of which have comb-like projections. During article-transport upwardly and downwardly, such projections come to bear at the automobiles to be conveyed, whereby they pass between the comb-like projections of the small wagons from which the automobile is raised or onto which it is deposited. In the other stories the spaces of the series of small wagons must be located at the lifting means in order to enable passage of the automobiles. Therefore, an article removal or storing operation requires displacement of the series of small wagons in all of the stories, and it is not possible to combine, in time-saving manner, an article removal operation with an article storage operation. Loading and unloading must always take place at the uppermost parking story.

Now, the present invention concerns itself with an installation in which, at a number of stories a plurality of similar article carrier-platforms provided with rollers or runners are displaceably arranged in a closed, horizontal path of movement or loop. Further, there is provided a spatially fixed lift means by means of which, during standstill of the carrier platforms at all of the stories, one carrier platform can be transferred from one story to another. The aforesaid lift means incorporates an elevator or lift platform which can be stopped at a desired story. Additionally, a drive mechanism is provided through the agency of which it is possible to place into movement, in the closed loop or track, the carrier platforms in that story in which the loop or track is closed by a track section provided at the aforesaid elevator platform.

In a known installation of this general type, as shown and described in U.S. Patent 2,916,168, of R. W. Coursey, granted Dec. 8, 1959, and entitled "Mass Storage System," the article-carrier platforms are constructed as suspension carriages. Moreover, in each parking story the track or loop is composed of two linear sections and two U-shaped sections for the turning or transfer means. The lift is located in the neighborhood of one of these transfer means. The motor drive for the horizontal displacement of the article-support platforms along the track is located somewhere in the building and drives a conveying chain means at one or another story through the agency of a vertical shaft. The conveyor chain means are located along the linear track sections, and furthermore, such drive means also drive chain means and arms of the transfer means. The aforementioned arrangement not only requires a considerable structural expenditure, but also necessitates a complicated, time-consuming mode of operation. In particular, one suspended carriage which has been removed from a series of suspended carriages by the lift for the purpose of unloading or loading, must always be returned to the same place in such series. Accordingly, this series must have imparted to it a circulatory movement in order that the transfer arm moves out of the zone of the lift. Thereafter, the track section associated with the lift must be driven without a suspension carriage to a different story, in order to receive at such location a suspension carriage. Such empty travel of the lift cannot be prevented during each storing and retrieval operation. Consequently, there automatically occur considerable performance times for these operations, and additionally a complicated control because two different manipulations are required. Furthermore, the suspension carriages cannot be exchanged.

Now, it is with regard to these drawbacks that the present invention provides an effective solution, and indeed, in that the drive mechanism is mounted at the elevator platform, and upon such elevator platform there is always located a carrier platform.

Owing to these measures it is not only possible to considerably minimize the structural expenditure, but it is also possible to thereby provide the prerequisites for markedly reducing the time necessary for storing and retrieving. This latter aspect is successfully achieved by virtue of the fact that not only does the carrier platform-track or loop always have a gap, but additionally, at the lift or elevator there is always located a loaded or unloaded carrier platform. Here again, this expedient renders it possible to combine a storing operation with a retrieval operation in time-saving manner.

Further advantages of the inventive installation reside in the fact that the lift can be arranged in an optional location at the track and there is attained a more simplified electrical control. The carrier platforms are exchangeable; if one is not concerned with an automobile parking installation, rather with an installation for storing articles, there is thus achieved the possibility of sorting.

Finally, there should be mentioned that since the invention permits many different track shapes (elongated oval, circular shaped, and so forth) and different arrangements of the lift, it is possible to take into account much easier the local requirements or conditions.

Different embodiments of the invention are possible in which at all of the stories for storing the articles the carrier platforms are movable along tracks which, similar to those of the previously mentioned United States installation, incorporate two linear track sections and two transfer stations.

A further group of embodiments is characterized by the features that in each story for unloading the articles, circular track sections are provided which together with at least one such section which is mounted at the elevator platform provides at least one closed circular track or loop for guiding at least two carrier platforms in that unloading story in which the elevator platform is located.

Such an installation can be advantageously accommodated in space-saving construction in a circular cylindrical-shaped shaft, and additionally, has the important advantage that the transfer stations are dispensed with, and therefore, the carrier platforms are moved in the unloading stories with uniform speed.

Accordingly, it is a primary object of the present invention to provide an improved installation for the effective handling of articles, wherein the installation itself is relatively inexpensive to manufacture, highly reliable in operation, efficient in carrying out its function of storing and unstoring articles, and generally, can be accommodated in most existing structures with a minimum of complications.

A further important object of this invention resides in the provision of an improved installation requiring a ground surface area which is small in comparison to the available storage or parking area, wherein the average time for transporting a parked vehicle or the relevant articles from a given location to the place of unloading is as small as possible, and wherein a given floor can be provided as the drive-in and drive-out floor, and moreover, the expenditure for the construction of the installation can be held within tolerable limits.

Yet a further noteworthy object of the present invention resides in the provision of an improved installation for the storing of articles which manifests itself by the relative ease and simplicity with which such articles can be shifted from place to place, the efficient use of the available surface area, the reliability of operation, the relatively uncomplicated structure, and the economy in constructing, installing and servicing such installation.

Other features, objects and advantages of the present invention will become apparent by reference to the following detailed description and drawings in which:

FIGURES 6 and 6a collectively depict a horizontal cross-sectional view taken along the line VI—VI of FIGURE 4;

Figure 1:
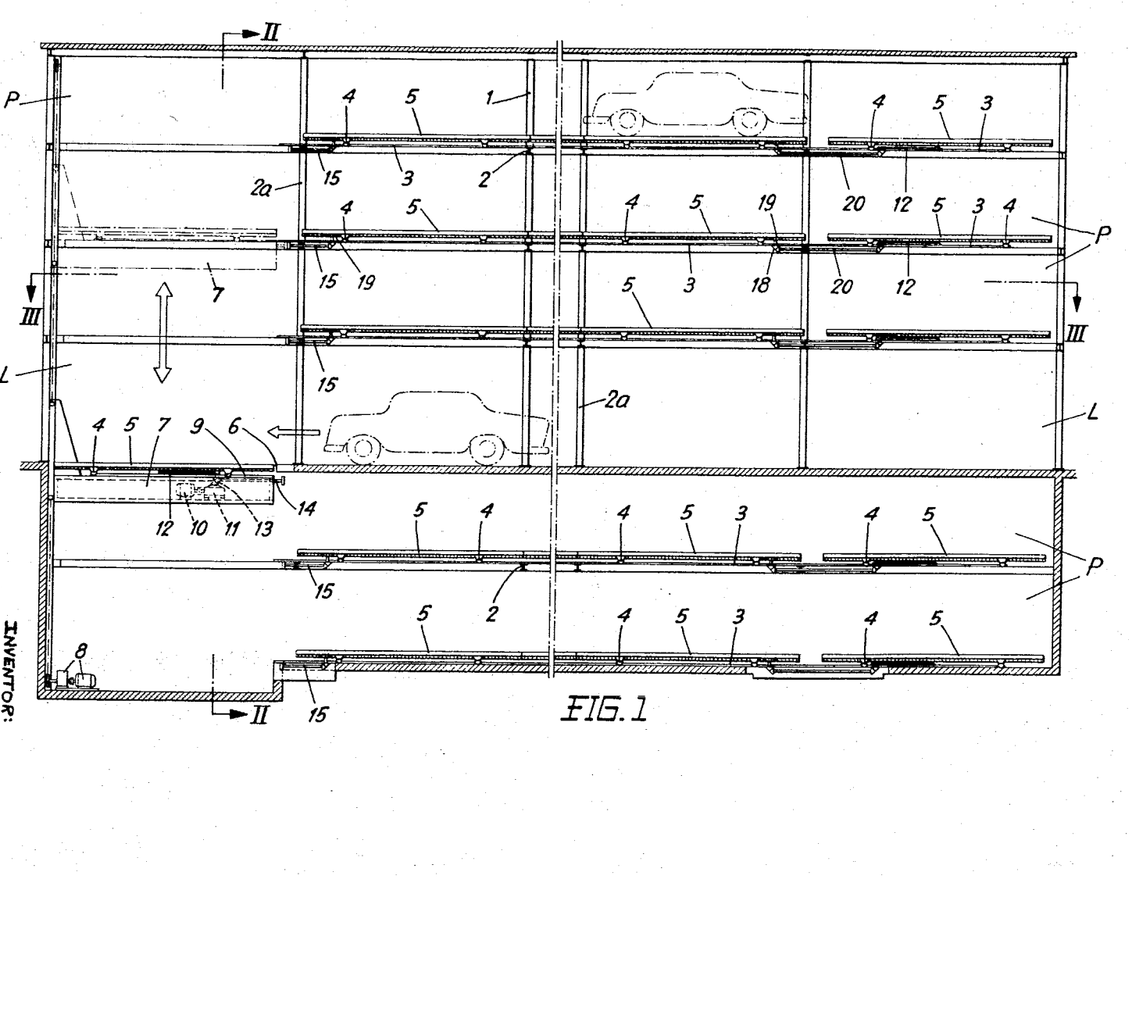
FIGURE 1 is a vertical sectional view through a first embodiment of inventive installation for the storing of articles or goods, particularly vehicles for instance.
Figure 2:
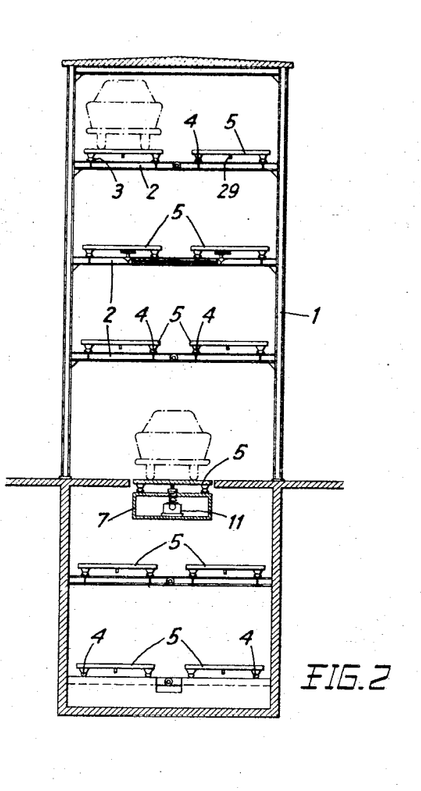
FIGURE 2 is a vertical cross-sectional view taken along the line II—II of FIGURE 1.
Figure 3:
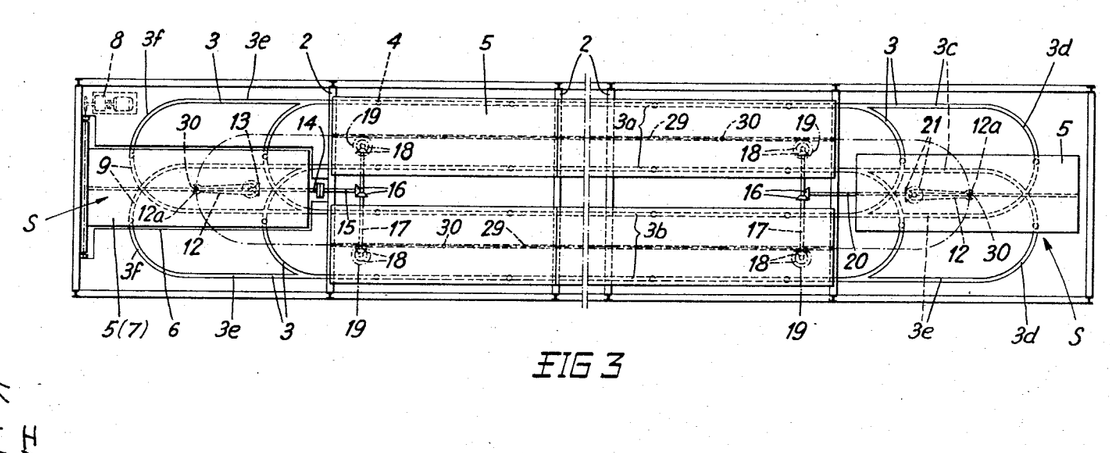
FIGURE 3 is a horizontal cross-sectional view taken along the line III—III of FIGURE 1.

Describing now the drawings, wherein throughout the various embodiments the same reference characters have been employed for like or analogous elements, in the embodiment of the inventive installation depicted in FIGURES 1 to 3, such having been illustrated by way of example for the parking of vehicles, this installation is shown to be partly aboveground and partly belowground. It will also be understood that the floor or story at ground level does not serve as a parking floor, rather as an unloading and loading floor L and as an area in which during rush hours a number of vehicles which are to be parked can be lined-up in a position awaiting parking. The truss structure of the installation constructed partially from concrete and partially as a steel structure exhibits, by way of example, in the aboveground portion columns 2a and horizontal supports 2. Such horizontal supports 2 are also located in the belowground portion. These supports 2 carry rails 3 of substantially U-shaped profile at the various parking stories or floors P. As best ascertained by referring to FIGURE 3, in the central region of the installation these rails 3 are linear, whereby they form two linear displacement tracks 3a and 3b for article-support platforms 5 equipped with travellers or runners 4 advantageously constructed as pivotable rollers.

By further referring to FIGURE 3 it will be seen that at one end of the installation the rails 3 are partially linear, as at 3c, partially semicircular shaped, as at 3d, this being particularly evident by inspecting the right-hand portion of such figure. An elevator or lift shaft 6 extends through all of the floors at the other end of the installation. In this elevator shaft 6 a lift or elevator platform 7, upon which there is always disposed or moves a support platform 5 provided with pivotable roller runners 4, is vertically displaceable in known manner by an electric drive motor 8 and can be stopped at a given parking story P as well as also at the loading and unloading floor L, in the manner depicted in FIGURE 2. In the region of this elevator shaft 6 the rails 3 are also partially linear, as at 3e, and partially semicircular shaped, as at 3f, and completed by means of rails 9 which are secured to the lift platform 7. Consequently, such physical structure provides at each end of each parking floor P a turning or transfer station S in which one of the support platforms 5 can be displaced from one of the linear tracks 3a or 3b onto the other linear track due to translatory circular movement, provided of course that the lift platform 7 is also located at this parking floor.

The motor drive or drive means for such a translatory movement of the support platforms 5 along the linear tracks 3a and 3b and in both of the turning stations S for all of the parking floors P is mounted at the lift or elevator platform 7 beneath the rails 9. This motor drive incorporates an assembly composed of an electromotor 10 and a transmission 11. The transmission output shaft carries a transfer or translating arm 12 and is in driving connection with a horizontal shaft 14 by means of a pair of bevel gears 13. The horizontal shaft 14 is coupled, during the time that the lift platform 7 stops, in slip free manner by non-illustrated means, for example an electric controlled magnetic servomotor, with a shaft 15 associated with the corresponding parking floor. This shaft 15 is operably connected via a pair of bevel gears 16 with a horizontal transverse shaft 17. Shaft 17 drives at both of its ends a respective gear 19 via pairs of bevel gears 18. At the other end of each parking floor remote from the lift shaft 6 there is provided a similar transverse shaft 17 which places similar gears 19 in driving relation with one another by means of pairs of bevel gears 18. Additionally, a transfer or translating arm 12 is also held in slip free driving relation with the gears 19 via a pair of bevel gears 16, a shaft 20 as well as a further pair or bevel gears 21.

The mode of operation of this embodiment will be explained hereinafter following the description of the manner of operation of the second embodiment, since with regard to the movements at a parking floor the manner of operation of both embodiments is similar to one another.

Figures 4, 5:
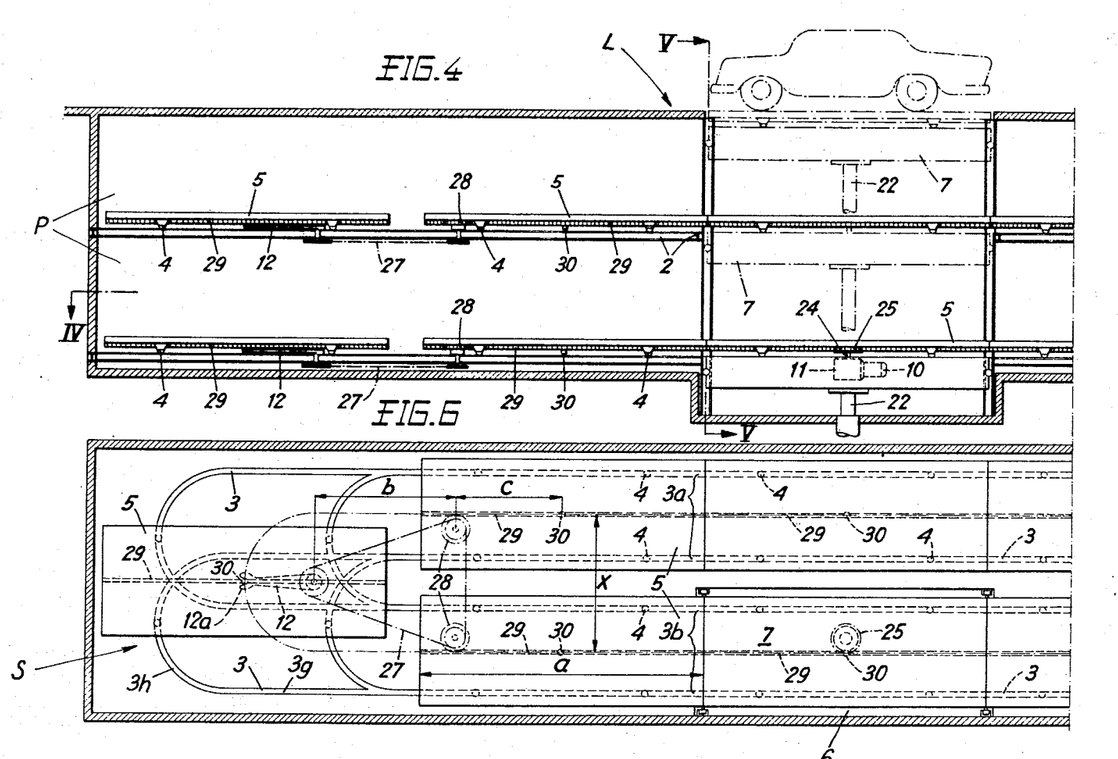
FIGURES 4 and 4a collectively depict a vertical sectional view, similar to FIGURE 1, of a second embodiment of inventive installation.
FIGURE 5 is a vertical cross-sectional view taken along line V—V of FIGURE 4.
Figure 4A:
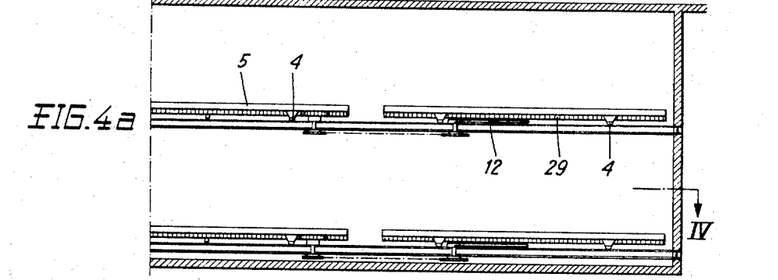
Figure 5:
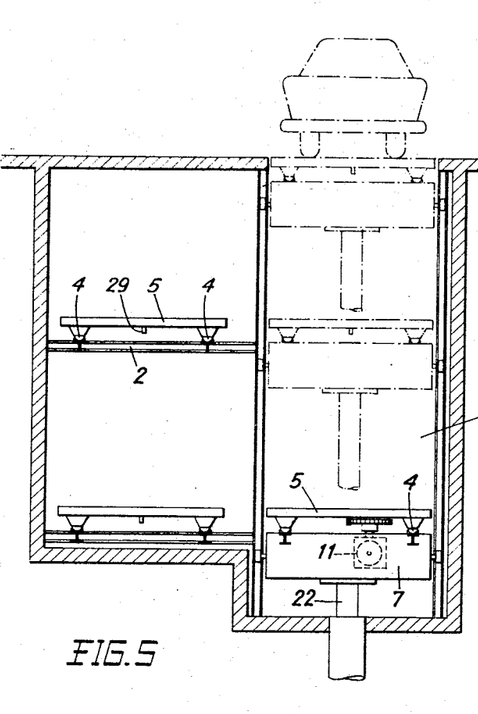
Figure 6A:
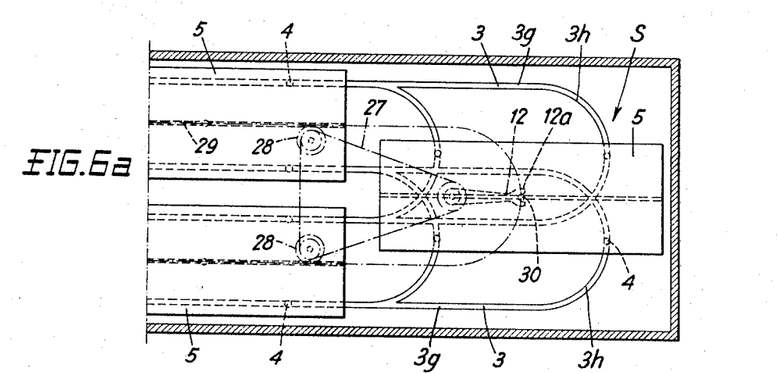
Figures 7A, 7B:
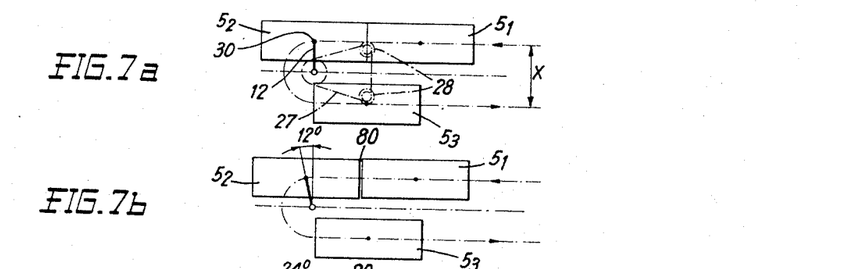
FIGURES 7a, 7b, 7c, 7d, 7e, 7f, 7g and 7h depict schematic plan views of successive positions of the support platforms in the region of one of the turning stations for an installation constructed according to FIGURES 1 to 3 or according to FIGURES 4 to 6.
Figure 7C:
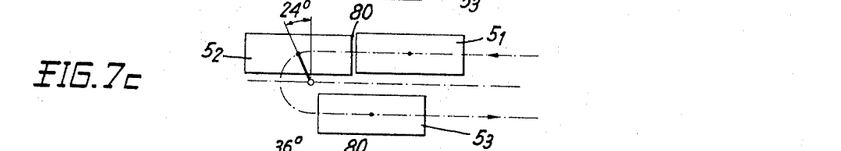
Figure 7D:
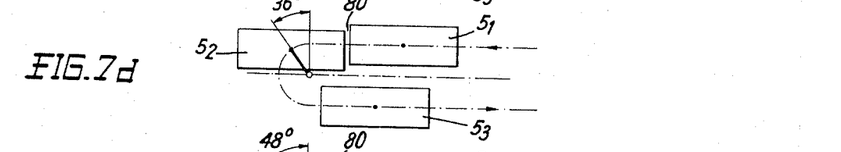
Figure 7E:
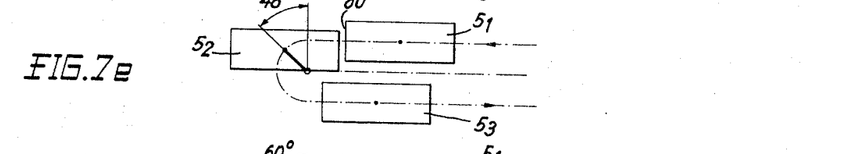
Figure 7F:
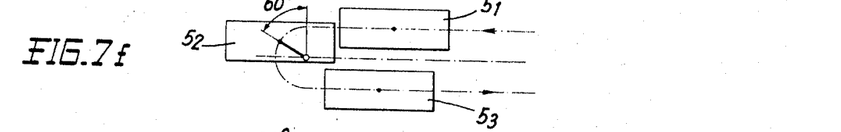
Figure 7G:
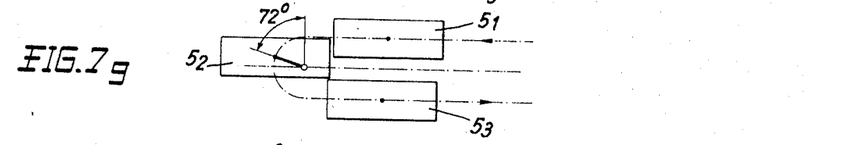
Figure 7H:
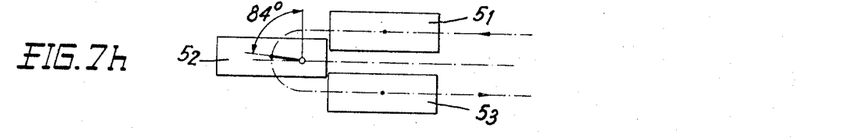

Now, the second embodiment depicted in FIGURES 4 to 6 is illustrated as a subterranean parking installation possessing only two belowground parking floors P. In each of these parking floors P there are again arranged linear or straight rails 3 which form two linear, adjacently disposed, displacement tracks 3a and 3b for article-support platforms 5 equipped with runners 4.

In this embodiment the elevator or lift shaft 6 extends through one of these tracks, such as track 3b for instance. The elevator or lift platform 7 is displaceable in known manner in this shaft 6 by means of a non-illustrated hydraulic motor incorporating a piston rod 22. Such lift platform 7 can be stopped at every parking floor P as well as at ground level loading and unloading floor L. The motor 10 and transmission unit 11 mounted at the lift platform 7 in this instance drives a gear 25 by means of a shaft 24.

A turning or transfer station S is located at each end of each parking floor P, with the rails 3 being partially linear, as at 3g, and partially semicircular shaped, as at 3h. At each of these turning stations S there is provided a transfer or translating arm 12 which is in slip free driving connection with two gears 28 via a chain drive 27. These gears 28 can be considered to correspond to the gears 19 of the first embodiment, and the chain drive 27 is equivalent to the drive connections 13, 14, 15 and 20, 16, 17, 18 of the first embodiment.

The length of the support platforms 5 must be accommodated to the length of the linear displacement tracks 3a and 3b provided at the individual parking floors P, so that the platforms 5 can be placed without intermediate spaces against one another at these linear tracks. As a result, the position of the lift shaft 6 is also prefixed. It will be appreciated that only in that parking floor in which there is temporarily located the lifting platform 7 with the support platform 5 situated thereon is the row of platforms 5 closed at the relevant linear track, whereas on the other hand, in the other parking floors of course, in this row there appears a gap, the length of which is exactly the same size as the length of an article-support platform 5.

All of the article-support platforms 5, also those of the first embodiment, at their underface possess a gear or toothed rack 29 formed from a row of bolts for instance. One of the gears 25 or 28 can mesh with one or the other side of this gear rack 29. Furthermore, each support platform 5 is provided at its central region beneath this toothed rack 29 with a pin 30 with which there can come into engagement the bifurcated end portion 12a of one or the other translating or transfer arm 12. It is to be understood that it is also necessary to carefully select the distance $x$ of both center lines of the lengthwise tracks 3a and 3b, the distance $b$ between a pivot axis of the relevant transfer arm and the connecting line of the respective rotational axis of the associated gear 28 or 19, the distance $c$ between this connecting line and the pin 30 of the next situated platform 5, and furthermore, the ratio of the speed of rotation of the transfer arm 12 and the associated gears 28 or 19, in order that the platforms do not come into conflict with one another at the transfer or turning stations S.

FIGURES 7a to 7h depict, by way of example, a series of successive positions of support platforms 5 in the second phase of a turning or transfer operation for the turning station S at the left-side of a parking floor P. In the first phase of such turning operation platforms $5_1$ and $5_2$ are displaced along the one linear track, such as track 3a, exactly through half the length from the position of FIGURE 6 (rest position) into the position according to FIGURE 7a. At the same time the gear 25 associated with the lift or elevator platform 7 acts upon the gear rack 29 of the article support platform 5 located in its vicinity and displaces the latter to the right. In so doing, this support platform 5 in turn pushes ahead of it a further support platform 5 located in front of the former, and such further support platform effects displacement, via the gear 26 and the chain drive 27 of the turning station S at the right-side, of the there movable support platform 5. This latter support platform displaces ahead of it the support platform located in front of such to the left, and the support platform located at the left-side turning station of these last-mentioned support platforms displaces via the gear 28 and the chain drive 27 one or more support platforms towards the elevator platform 7.

At the end of the first half of the turning operation the transfer arm 12 engages the bolt 30 of the support platform $5_2$ and then moves such support platform $5_2$ with an accelerated translatory motion along the semicircular-shaped track formed by the semicircular-shaped rail sections 3h. A gap 80 then slowly appears between the support platforms $5_2$ and $5_1$ as such is indicated by the FIGURES 7b, 7c, 7d and 7e. This temporary gap 80 is necessary because the displacement component of the support platform $5_2$ in the direction of the linear track naturally falls off, whereas on the other hand the trailing or subsequent support platform $5_1$ moves forwardly with uniform speed. In reverse manner during the second phase of the turning operation the support platform $5_3$, which is moved by the transfer or translating arm 12 during the first half of this operation, is displaced with the same uniform speed as the support platform $5_1$ and the other support platforms located in the relevant linear track. The support platforms $5_2$ and $5_3$ just pass one another approximately in the position of FIGURE 7g.

In order to dampen the impact which occurs when the support platform $5_3$ runs against the support platform moving in front of it, the support platforms 5 are advantageously equipped at their end surfaces with bumpers or equivalent expedients formed of rubber or the like, whereby in FIGURE 6 the length $a$ of these support platforms is to be considered as measured past the bumpers. In the other turning station S the turning operation takes place in exactly the same manner.

The described mode of operation is also applicable for the turning stations S of the first embodiment of FIGURES 1 to 3 if there is not taken into consideration the fact that the force for the entire course of movement in closed cyclic path emanates from motor drive means which are arranged and switched-in at another location of this closed cyclic path.

Figure 8:
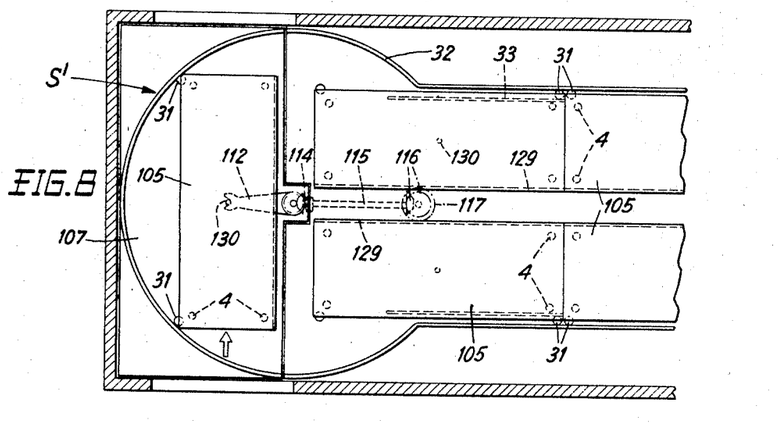
FIGURE 8 is a fragmentary horizontal cross-sectional view of a variant form of one of the turning stations.

In FIGURE 8 there is depicted a variant form of turning station S' for an installation constructed approximately according to the embodiment of FIGURES 1 to 3, wherein the support platforms 105 are not only provided with runners 4 travelling upon a concrete or sheet iron ceiling without rails, rather also possess lateral guide rollers 31 by means of which they are guided at a stationary rail 32 and partially at the rail 33 during movement along the linear tracks as well as also during transfer from one to the other of these tracks. Furthermore, the support platforms 105 possess a gear rack 129 at their one lengthwise side. The motor and transmission unit housed at the lift or elevator platform 107, when the elevator platform is located at a parking story or floor, is drivingly connected in slip free manner with a gear 117 by means of the shafts 114, 115 and the pair of bevel gears 116. This gear 117 engages with the gear or toothed racks 129 of the support platforms 105 temporarily located upon the linear tracks. Also, in this embodiment the transfer or turning arm 112 engages with a bolt 130 centrally mounted at the underface of each support platform 105.

Due to the different construction of the guide means for the support platforms at the turning stations S the turning operation does not take place with a translatory circular movement, rather by virtue of a combined displacement and pivoting through 180°. Moreover, the U-shaped rails for guiding are no longer used. It is to be distinctly understood that this manner of turning could find application in analogous manner also in an installation constructed approximately according to the embodiment of FIGURES 4 to 6.

Numerous other changes are also conceivable. For example, instead of a single turning or transfer arm 12 provided at the turning stations S of both of the initially described embodiments, there can be provided two synchronously turning or transfer arms which are always parallel to one another and which engage with two bolts 30 provided at each support platform 5. The U-shaped rails arranged in a semicircle for guiding the support platforms 5 can be replaced by rails which prevent release of the support platforms 5 from the parallel transfer arms. Installations such as those described with adaptations within the sphere of those skilled in the art, can be used other than for parking of vehicles e.g. automobiles, such as for the storing of wares or goods. The entire installation can be automatically controlled by means of known electrical devices, for instance terminal switches, relays, copying means, e.g. for programming.

Several embodiments will be described hereinafter wherein the support platforms are moved at the parking stories or floors along annular- or circular-shaped tracks.

Figure 9:
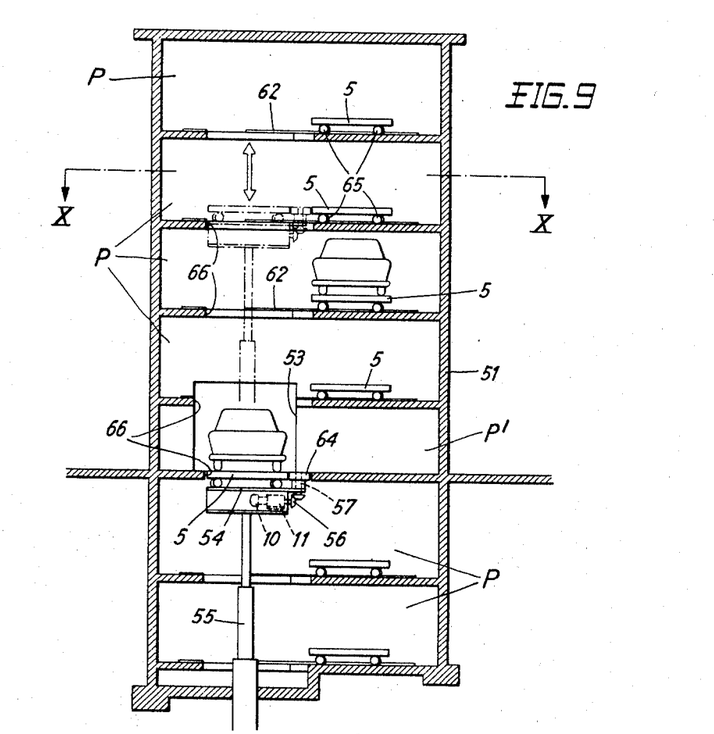
FIGURE 9 is a vertical sectional view of the installation of the first embodiment of FIGURES 1 to 3, yet here provided with support platforms which ride upon annular or circular rails at the parking floors.
Figure 10:
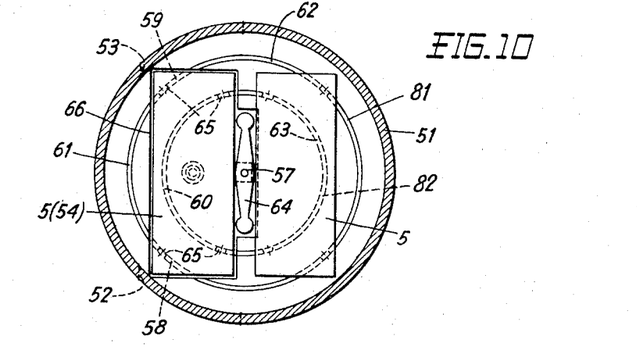
FIGURE 10 is a horizontal cross-sectional view taken along the line X—X of FIGURE 9.

The embodiment depicted in FIGURES 9 and 10 possesses as small as possible plan or ground surface area. In a substantially circular cylindrical-shaped building or structure 51 which can have as many aboveground and belowground stories or floors as desired, there are provided openings 52 and 53 for the inlet and exit of the objects, in this case assumed to be automobiles. The lift platform 54 of the sole elevator or lift 55 in plan possesses the same form and size as the support platforms 5. This lift platform 54 is equipped with a motor drive for a double-arm turning or transfer member 64. This drive is shown to comprise an electric motor 10, a transmission 11, a bevel gear drive 56 and a shaft 57. Additionally, the aforesaid lift platform 54 is provided at its upper surface with sections 58, 59 of an outer ring rail or track 81 and a section 60 of an inner ring rail or track 82. Sections 61, 62 of the outer ring or circular track 81 and a section 63 of the inner ring or circular track 82 are provided at the floor of all of the parking stories P, so that when the lift or elevator platform 54 is flush with the floor of a given parking story exhibiting an appropriate throughpassage opening 66 the rail sections 58, 59, 61, 62 practically without spaces form a circular-shaped or annular external ring rail or track 81 and the sections 60, 63 likewise form an inner ring rail or track 82, with the common center of both ring tracks 81, 82 disposed upon the common axis of rotation of the shaft 57 and the transfer member 64 fixedly seated upon such shaft. One of the revolving article-support platforms 5 is always located upon the lift or elevator platform 54. In the position of the lift platform 54 depicted in FIGURE 10 the revolving support platform 5 located upon such lift platform is horizontally disposed upon the floor of the driving-in and driving-out parking story P' likewise exhibiting a throughpassage opening 66 and the automobile which has been parked can be driven away and a different one placed upon such support platform 5. On the other hand, if the lift platform 54 is disposed at the floor of a given parking story then through half a rotation of the transfer or turning member 64 both of the support platforms 5 located there, together with the vehicles parked thereon, can be interchanged in position, whereby the four flanged or rim rollers 65 of each of both support platforms 5 travel in pairs upon the inner and outer circular tracks 82 and 81 respectively.

Figure 11:
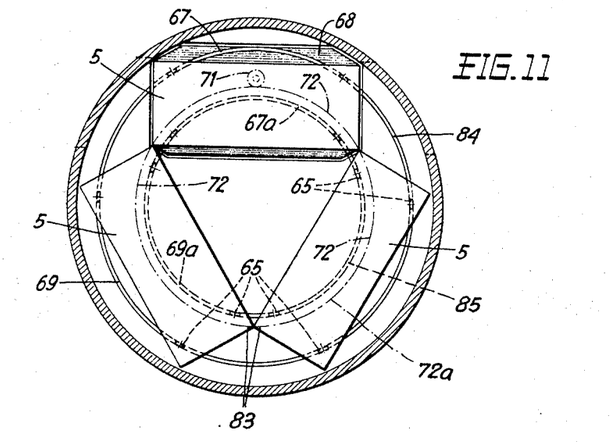
FIGURES 11 and 12 are horizontal cross-sectional views, similar to FIGURE 10, of two further respective embodiments with support platforms which are displaceable upon annular or circular rails.

The embodiment depicted in FIGURE 11 is similar to that just-described as regards the vertical construction. In each parking story there is room for three support platforms 5 which in pairs abut against one another at the confronting corners 83 and by means of pairs of rimmed rollers 65 travel upon two circular tracks 84, 85. Each of these circular tracks 84 and 85 possesses a section 67 and 67a respectively connected to that lift or elevator platform 68, whereas the remaining section or portion 69 and 69a respectively of each circular track 84 and 85 respectively, is provided at the floor of each parking story. The motor and transmission unit 10, 11 mounted to the lift platform 68 in the manner of FIGURES 9 and 10, here again drives the shaft 57 via a bevel gear drive 56. In this embodiment, however, instead of the transfer or turning member 64 seated on the shaft 57 a pinion 71 is secured to such shaft. This pinion 71 engages with circular-shaped gear or toothed racks 72 connected to the underface of the respective support platforms 5, with the three gear racks 72 of the three support platforms 5 located at that parking story at which the lift platform 68 is temporarily located collectively forming a closed ring gear or toothed rim 72a, the pitch circle of which extends through the respective pair of abutting platform edges 83. During transfer of the support platform in a parking story the pinion 71 acts upon the gear rack 72 of one of the three support platforms 5 and such platform pushes both of the others in front of it.

Figure 12:
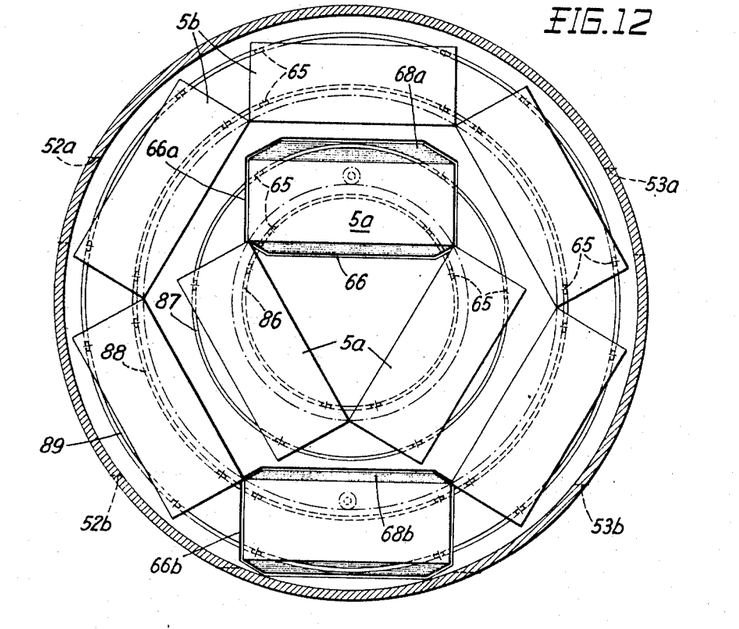

The embodiment depicted in FIGURE 12 embodies two independently drivable installation portions which are coaxially stacked within one another, each of which is similar to the arrangement previously described in that at each parking story two circles of article-support platforms 5 are located. More specifically, there is provided an inner circle of support platforms which incorporates three support platforms 5a and an outer circle of six support platforms 5b. A first lift having an elevator or lift platform 68a movable through opening 66a is provided for handling the portion of the installation with which there are associated the three support platforms 5a travelling upon the inner pair of circular tracks 86, 87 of each parking story. A second lift with an elevator or lift platform 68b movable through openings 66b is provided for handling the portion of the installation with which there are associated the support platforms 5b travelling upon the outer pair of circular rails 88, 89 of each parking story. The story for diving-in and diving-out the vehicles is provided with openings 52a, 53a for the inner portion of the installation and openings 52b, 53b for the outer portion of the installation arranged such that the drive-in and drive-out tracks for both portions of the installation are parallely disposed, that is, at least do not intersect one another. For such reasons both of the portions of the installation can be operated independently of one another.

Naturally, other installations are possible in which not only the previously described two so-called elementary installations are arranged in stacked formation, rather as many elementary installations as desired are arranged in coaxially stacked manner within one another.

With regard to further details of physical structure the following is mentioned:

Those edges of each support platform 5 (or 5a, 5b) which bear against neighboring support platforms, in actual practice are not formed as sharp corners, rather, replaced by shock-absorbing bumper elements which, for example, can be of cylinder segment-like shape so that they possess rounded bumper surfaces. A further possibility resides in imparting a trapezoidal-shape to the support platforms 5, so that the end sides coincide with radii of the previously mentioned rim or circle of platforms, such end sides of successive platforms bearing against one another, that is, over the entire width of the platform. At each such end side the bumper surface can be constructed from a strip of shock-absorbing material, such as rubber for example. The drive-in and drive-out story or floor can then also be used as a parking story, whereby the automobiles move-in and move-out via the platforms 5, or 5a, 5b forming a gapless, closed, ring-shaped rotary disk. These then advantageously possess a circular-shaped external surface.

Moreover, link or wheel chains advantageously available on the commercial market can be used as the "arc-shaped gear or toothed racks" 72 in order to keep down construction costs. Such must only possess the correct length and, in particular, must be connected at their ends to the associated support platform such that the required arc-shaped course results. The ends of the chain destined to engage in the tooth spaces of the drive pinion 71 are advantageously arranged set back through half the chain division with respect to the neighboring bumper surface.

In order to guide the support platforms 5 (or 5a, 5b) a pair of circular rails could be replaced by a single circular or annular track upon which, in addition to runners or small rollers, there would bear rollers mounted at the platform in a manner already known to the art from monorails.

The embodiments according to FIGURES 1 to 8 can also be "doubled" or "multiplied" in a manner analogous to the embodiment of FIGURE 12. In all basic or elementary installations which are independently operated with regard to one another and for each group of support platforms, the lift means always consists of only a single lift.

What is claimed is:

1. Installation for storing articles, especially for parking vehicles, comprising a housing, a number of storage stories for articles supported by and within said housing, each storage story being provided with substantially horizontal disposed track means, a plurality of similarly constructed article-support platforms movably arranged at said track means of said number of storage stories, each of stad article-support platforms being provided with runners, spatially fixed lift means for transferring a support platform from one storage story to another when the article-support platforms at all of the stories are at standstill, said lift means incorporating an elevator platform capable of being stopped at a given storage story, track section means carried by said elevator platform, drive means for displacing the article-support platforms in that horizontally disposed track means of a given storage story which is closed by said track section means carried by said elevator platform, said drive means being mounted at said elevator platform, the latter of which always has disposed thereon an article-support platform, said track means of each storage story comprising two adjacently arranged linear tracks and two transfer stations for respectively moving said article-support platforms by translatory motion along a substantially semicircular-shaped path, each of said transfer stations including at least one transfer arm, a toothed rack and at least one pin provided for each article-support platform, said transfer arm engaging said pin during turning of the associated article-support platform, gear means arranged at each end of said linear tracks and engageable with said toothed rack of an associated article-support platform, said drive means including means providing a slip-free driving connection between said transfer arms of both said transfer stations and said gear means at that storage story at which said lift means is disposed, said slip-free driving connection also encompassing the article-support platforms together with their associated toothed rack moving along said linear tracks.

2. Installation as defined in claim 1, including an elevator shaft in which said elevator platform is movably arranged, said elevator shaft extending through one of said linear tracks of each of said number of storage stories, said drive means including a shaft member mounted at said elevator platform and a gear fixedly seated upon said shaft member, said gear engaging with said toothed racks of said article-support platforms, said respective gear means at each end of said linear tracks being in slip-free driving connection with the corresponding transfer arm of the associated transfer station.

References Cited

UNITED STATES PATENTS

| | | | |
|---|---|---|---|
| 2,693,770 | 11/1954 | Hubscher | 214—16.1 |
| 2,849,127 | 8/1958 | Densmore | 214—16.1 |
| 2,916,168 | 12/1959 | Coursey | 214—16.1 |

GERALD M. FORLENZA, *Primary Examiner.*

RAYMOND B. JOHNSON, *Assistant Examiner.*